United States Patent [19]
Coyle, Jr. et al.

[11] Patent Number: 5,013,119
[45] Date of Patent: May 7, 1991

[54] FABRICATION OF AN INTEGRATED OPTICAL FIBER BUS

[75] Inventors: Richard J. Coyle, Jr., Lawrenceville, N.J.; Gary J. Grimes, Thornton; Lawrence J. Haas, Broomfield, both of Colo.; Anthony J. Serafino, Cranbury; George J. Shevchuk, Old Bridge, both of N.J.

[73] Assignee: AT&T Bell Laboratories, Murray Hill, N.J.

[21] Appl. No.: 454,613

[22] Filed: Dec. 21, 1989

[51] Int. Cl.$^5$ .............................................. G02B 6/28
[52] U.S. Cl. ............................ 350/96.16; 350/96.15; 430/323
[58] Field of Search ............... 350/96.15, 96.16, 96.19, 350/3.61, 96.29; 430/323; 219/121 LH

[56] References Cited

U.S. PATENT DOCUMENTS

| | | | |
|---|---|---|---|
| 4,598,039 | 7/1986 | Fischer et al. | 430/323 |
| 4,626,652 | 12/1986 | Bjork et al. | 219/121 LH |
| 4,676,594 | 6/1987 | Presby | 350/96.29 |
| 4,682,843 | 7/1987 | Mahlein et al. | 350/96.15 |
| 4,725,110 | 2/1988 | Glenn et al. | 350/3.61 |
| 4,749,248 | 6/1988 | Abersen, Jr. et al. | 350/96.19 |
| 4,784,452 | 11/1988 | Hodge et al. | 350/96.15 |
| 4,793,680 | 12/1988 | Bryon | 350/96.19 |
| 4,962,986 | 10/1990 | Hompel et al. | 350/96.15 |

FOREIGN PATENT DOCUMENTS

63-163308  6/1988  Japan.

OTHER PUBLICATIONS

Zonotins, Thomas A.; Poulin, Darcy; Reid, John, "Excimer Lasers: On Emerging Technology in Materials Processing", *Laser Focus/Electro-Optics*, (May, 1987), pp. 54-70.

Primary Examiner—Akm Ullah
Attorney, Agent, or Firm—John C. Moran

[57] ABSTRACT

An apparatus for fabricating optical fiber mode scramblers and optical fiber couplers as an integral part of an optical bus by the utilization of a laser to remove cladding on the optical fiber bus to form the mode scramblers and couplers. An excimer laser is utilized to ablatively remove the cladding which is a polymer material. The optical core is composed of a material which is not readily affected by the excimer laser. The optical bus is fabricated by enclosing an optical fiber in an optical bus assembly. The optical fiber has only cladding and an optical core and has no buffer surrounding the cladding. The optical bus assembly provides for a plurality of optical couplers for removing and adding light to the optical bus and intermixed with the optical coupler are a plurality of optical scramblers.

11 Claims, 4 Drawing Sheets

5,013,119

FABRICATION OF AN INTEGRATED OPTICAL FIBER BUS

TECHNICAL FIELD

The present invention relates to an integrated optical fiber bus and, more particularly, to an optical fiber mode scrambler and an optical coupler fabricated as an integral part of an optical fiber bus assembly.

BACKGROUND OF THE INVENTION

Optical fiber buses are intended to replace electical buses in computers and communication switching systems. To fulfill this function, the optical fiber bus must allow for optical connections at very close intervals along the length of the bus. Because of the necessity for optical couplers (also referred to as taps) to be closely spaced along the optical fiber bus, two problems arise. The first problem is that optical couplers remove the higher order light modes from the bus so that downstream optical couplers receive only low order light modes which are not readily removed from the optical fiber bus for detection by optical couplers. Mode scramblers that redistribute the low order light modes to the high order light modes for the downstream optical couplers can solve this problem; however, these mode scramblers introduce the second problem of placing a large number of optical couplers and mode scramblers along a limited amount of optical fiber bus space at a reasonable cost.

The problem remaining in the prior art is the need for fabricating optical mode scramblers and optical couplers in a limited amount of optical fiber bus space using the same fabrication process.

SUMMARY OF THE INVENTION

A departure in the art is achieved by an apparatus and method for fabricating an optical fiber mode scrambler and an optical coupler as an integral part of an optical fiber bus by the utilization of a radiation source to remove cladding on the optical fiber bus thus forming an optical mode scrambler and an optical coupler. The radiation source may advantageously be an excimer laser. The excimer laser is utilized to ablatively remove the cladding which is a polymer material. The optical core is composed of a material not readily affected by the excimer laser.

In a preferred embodiment of the invention, the optical fiber bus is fabricated by enclosing an optical fiber in an optical bus assembly. The optical fiber is only an optical core and cladding and has no buffer surrounding the cladding. The optical bus assembly provides for a plurality of optical couplers intermixed with a plurality of optical scramblers. After the optical bus assembly has been secured around the optical fiber, a controller is utilized to step the optical bus assembly past an excimer laser so that coupler openings and mode scrambler patterns can be formed in the cladding.

The laser utilizes apertures defining patterns for forming the coupler openings and mode scrambler patterns. First, the shape of the output beam of the laser is defined by a selected aperture and then focused by a lens assembly onto the optical bus cladding via one of the milling apertures in the optical bus assembly. After one milling operation is performed, the assembly is repositioned by the controller so the next milling operation can take place. The controller automatically selects the appropriate aperture for each operation. The optical bus assembly provides a guide to support and secure a coupler fiber aligned with each coupler opening.

Other and further aspects of the present invention will become apparent during the course of the following description and by reference to the accompanying drawing.

BRIEF DESCRIPTION OF THE DRAWING

Referring now to the drawing.

DETAILED DESCRIPTION

Figure 1:
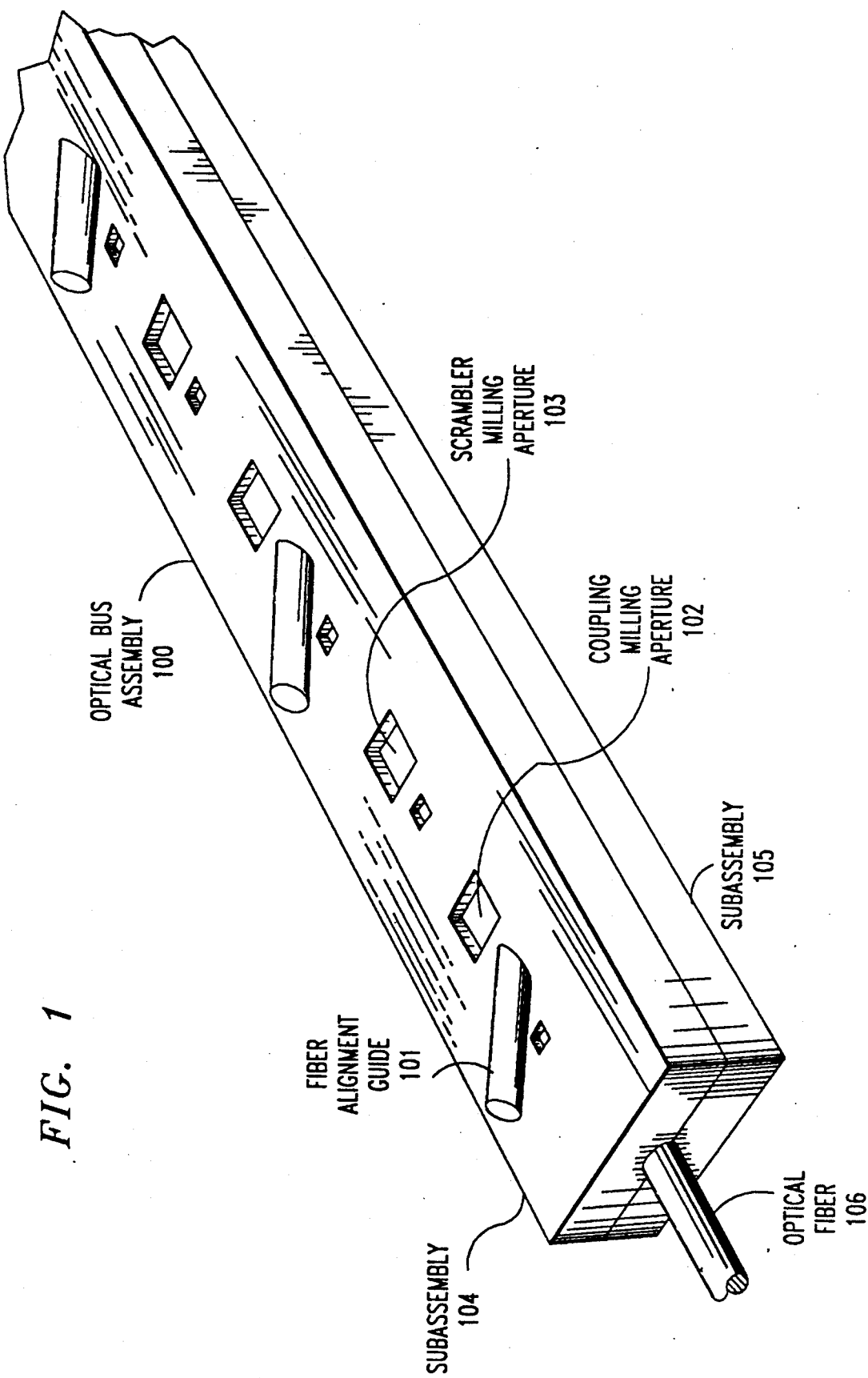
FIG. 1 illustrates an optical bus assembly in accordance with the present invention.
Figure 2:
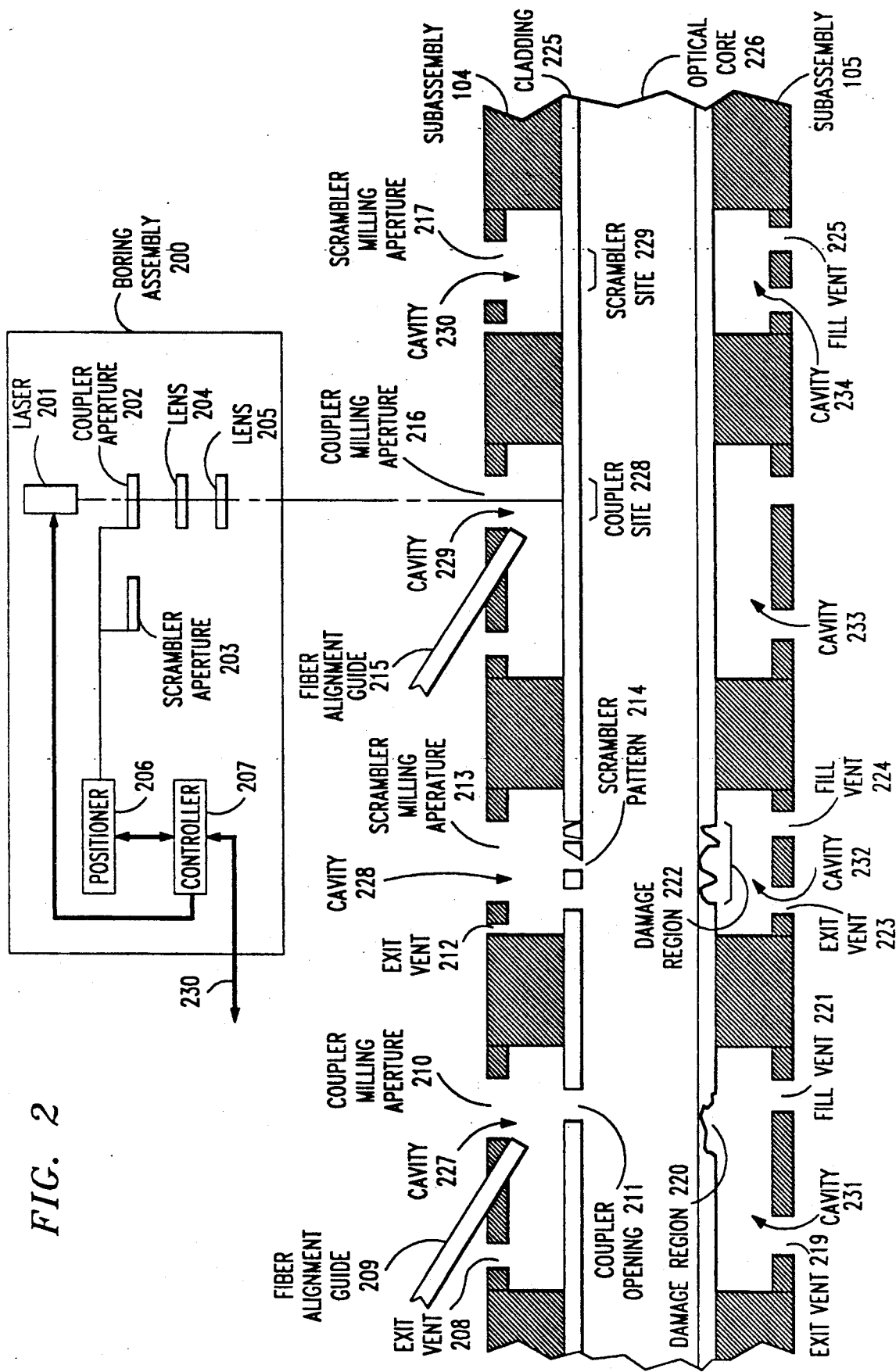
FIG. 2 illustrates a cross-sectional view of the optical bus assembly.
Figure 3:
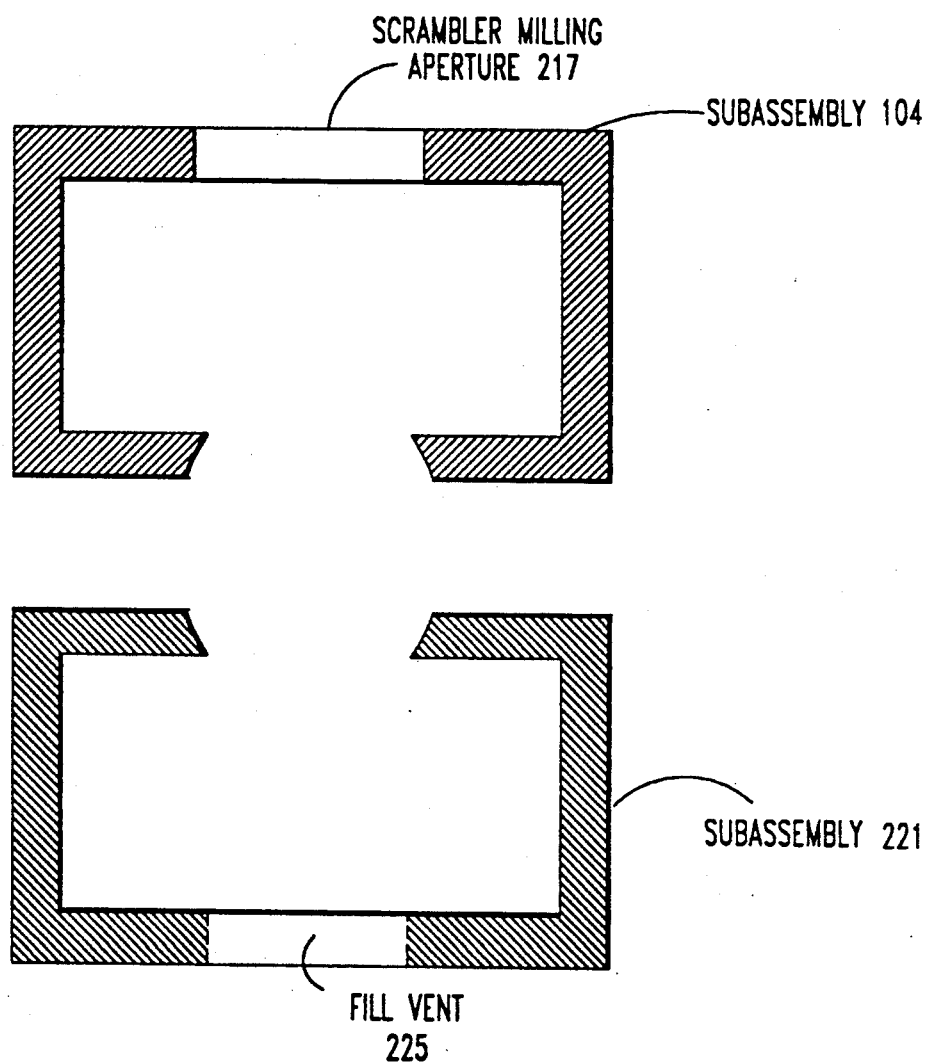
FIG. 3 illustrates another sectional view of the optical bus assembly.

FIG. 1 illustrates optical bus assembly 100. In accordance with the invention, a radiation source, such as a laser, fabricates optical mode scrambler patterns and optical coupler openings as an integral part of optical fiber 106. Optical fiber 106 consists only of an optical core surrounded by a cladding layer. Optical bus assembly 100 is fabricated by attaching subassemblies 104 and 105 around optical fiber 106. Details of these subassemblies are given in FIGS. 2 and 3. The subassemblies are secured to each other using conventional methods such as gluing. After optical bus assembly 100 has been assembled, boring assembly 200, as illustrated in FIG. 2 ablatively removes the cladding to form coupler openings via coupling milling apertures (e.g., aperture 102) and mode scrambler patterns via scrambler milling apertures (e.g., aperture 103). The patterns formed at the scrambler sites may be patterns similar to those disclosed in U.S. Pat. No. 4,676,594. After a mode scrambler pattern has been fabricated via a scrambler milling aperture, a material whose index of refraction is less than the cladding is injected into the milling aperture cavity. Similarly, after the coupler opening has been prepared, a junction media that transmits light to or from the coupler opening and that physically secures a coupler fiber is injected into the coupler milling aperture.

In FIG. 2, Laser 201 is advantageously a Questek Model 2660 excimer laser which when operated advantageously at a wavelength of 193 nanometers (nm) ablates cladding material 225. Cladding 225 is advantageously a 10–15 micron thick fluorinated acrylate. Lenses 204 and 205 form a 4:1 telescope. The focal length of the lenses is adjusted for a wavelength of 193 nanometer (nm). An image one-fourth the original size of the aperture is formed at the focal point of lens 205. This image is projected as a predefined pattern onto cladding 225. Laser 201 is operated in the pulse mode under control of controller 207. The energy density at each site is advantageously in the range of 5 to 10 milliJoules/millimeter$^2$.

In accordance with the invention, both the couplers and the mode scramblers are formed utilizing the same materials process with controller 207 automatically stepping optical bus assembly 100, which is secured to carrier 401, past boring assembly 200. Carrier 401 moves in a horizontal direction on track 403 with mechanical force being applied by stepper motor 402.

Figure 4:
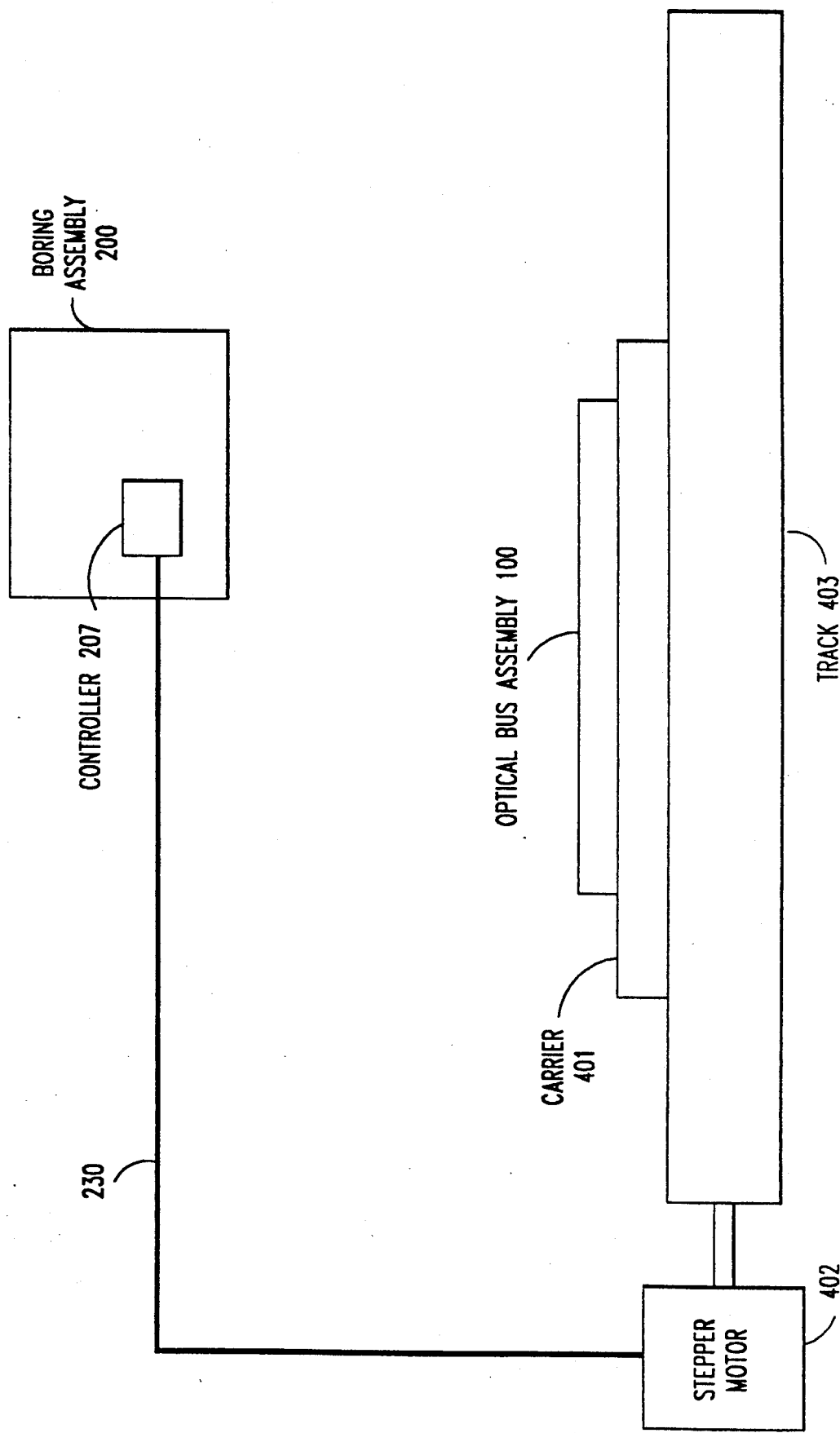
FIG. 4 illustrates an apparatus that allows a controller to determine the positioning of the optical bus assembly for fabrication of couplers and mode scramblers.

Using the apparatus of FIG. 4, controller 207 positions optical bus assembly 100 to bring coupler milling aperture 210 into alignment with the beam of laser 201 by controlling stepping motor 402. Controller 207 then fabricates coupler opening 211 using laser 201 with the laser beam being formed by coupler aperture 202. After forming coupler opening 211, controller 207 actuates stepper motor 402 to bring scrambler milling aperture 213, where mode scrambler pattern 214 will be formed, into alignment with the beam of laser 201. Controller 207 then fabricates mode scrambler pattern 214 using laser 201 with the laser beam being formed by scrambler aperture 203. After forming scrambler pattern 214, controller 207 continues to position carrier 401 to align milling apertures 216 and 217 with sites 228 and 229, respectively, then utilizes either aperture 202 or aperture 203 as well as laser 201 with the appropriate amount of energy to form either a coupler opening or scrambler pattern. Carrier 401, stepper motor 402, and track 403 are constructed using well known techniques in the art.

After all the coupler openings and scrambler patterns have been formed in optical bus assembly 100, it is removed from carrier 401 of FIG. 4. At that point, cavities 227 through 234 are filled with the appropriate material. For example, cavity 227 above coupler opening 211 is filled with a junction media after a coupler fiber has been inserted into fiber alignment guide 209. The junction media is injected into the cavity through coupling milling aperture 210, and the air is released through exit vent 208. If the light is to be extracted from coupler opening 211, the junction media has a higher index of refraction than core 226. If light is to be launched from the coupler fiber into coupler opening 211, the junction media has a higher index of refraction than cladding 225. Cavities 228 and 230 at the scrambler patterns are filled with a material that has a lower index of refraction than cladding 225. For cavity 228, this material is injected into scrambler milling aperture 213, and the air is vented through exit vent 212. In addition to filling the cavities immediately around the coupler and scrambler sites, it is necessary to repair the damaged cladding regions opposite these sites, i.e., damage regions 220 and 222. These damage regions are repaired by injecting a material with substantially the same index of refraction as cladding 225 into these cavities through filling vents 221 and 224.

It is to be understood that the above-described embodiment is merely illustrative of the principles of the invention and that other arrangements may be devised by those skilled in the art without departing from the spirit and scope of the invention. Although an excimer laser has been used to remove cladding, another suitable radiation source can be used. Other optical bus assemblies can be envisaged by those skilled in the art.

We claim:

1. Apparatus for fabricating optical couplers and optical mode scramblers on an optical fiber which has a cladding surrounding an optical core, said apparatus comprising:

a boring assembly;

a bus assembly attached to said optical fiber and said bus assembly having a plurality of mode scrambler milling apertures each aligned with an individual one of a plurality of mode scrambler sites and a plurality of coupler milling apertures each aligned with an individual one of a plurality of coupler sites;

said boring assembly having a radiation source and a first aperture to define a first predefined pattern at each of said coupler sites by forming radiation from said radiation source and a second aperture to define a second predefined pattern at each of said mode scrambler sites by forming radiation from said radiation source;

lens for focusing said formed radiation by said first aperture through each of said coupler milling apertures onto each of said coupler sites;

controller for controlling the energy level of said radiation so as to substantially ablate all of the cladding corresponding to said first predefined pattern at each of said coupler sites;

said lens further focusing radiation formed by said second aperture through each of said mode scrambler milling apertures onto each of said mode scrambler sites; and controller for controlling the energy level of said radiation source so as to substantially ablate all of the cladding corresponding to said second predefined pattern at each of said mode scrambler sites.

2. The apparatus of claim 1 wherein said optical core is of a material which is substantially unaffected by said radiation at said energy level.

3. The apparatus of claim 2 wherein said radiation source is an excimer laser.

4. The apparatus of claim 3 wherein said controller determines said energy level by pulsing said laser 40 to 80 times to form said site at pulse repetition rate of one pulse per second with an energy of 5 to 10 milliJoules/square millimeter at said sites.

5. The apparatus of claim 3 wherein said assembly has a coupler fiber alignment guide positioned with each of said coupler milling apertures and each of said coupler fiber alignment guides accepts a coupler fiber to provide proper alignment of said coupler fiber with the coupler site thereby resulting in a optical coupler at each of said coupler sites.

6. The apparatus of claim 5 wherein said bus assembly comprises a first and second subassembly with said first subassembly having said mode scrambler and coupler milling apertures and said coupler fiber alignment guides and forming a cavity surrounding each of said coupler sites so that a junction media can be injected into said cavity through each of said coupler milling apertures after the ablation of the cladding at said coupler sites and said junction media allowing for the communication of light between said coupler fibers and said coupler sites.

7. Optical bus comprising:

an optical fiber which has cladding surrounding an optical core;

a bus assembly attached to said optical fiber;

said bus assembly comprises a first and second subassembly;

said first subassembly comprises a plurality of mode scrambler milling apertures each aligned with an individual one of a plurality of optical mode scrambler patterns and each of said mode scrambler patterns was formed in said cladding by the ablative removal of said cladding by a laser;

said first subassembly further comprises a plurality of coupler milling apertures each aligned with an individual coupler opening and each of said coupler openings was formed in said cladding by the ablative removal of said cladding by a laser;

said first subassembly further comprises a plurality of coupler fiber alignment guides each positioned with an individual one of said coupler milling apertures and each of said coupler fiber alignment guides properly aligning an individual coupler fiber with the coupler opening;

said first subassembly forming a plurality of coupler cavities each surrounding an individual one of said coupler openings and each of said coupler cavities containing a junction media adaptively injected into said coupler cavity through the coupler milling aperture associated with said individual one of said coupler openings and said junction media allowing for the communication of light between said coupler fibers and said coupler openings thereby resulting in a optical coupler at each of said coupler openings;

said first subassembly further forming a plurality of mode scrambler cavities each surrounding an individual one of said mode scrambler patterns and each mode scrambler cavity containing a material adaptively injected into said mode scrambler cavity through the mode scrambler milling aperture associated with the individual one of said mode scrambler patterns and said material preserving the optical transmission characteristics of said optical fiber thereby resulting in a optical mode scrambler at each of said mode scrambler patterns; and said second subassembly forming a plurality of repair cavities each surrounding an individual one of the portions of said optical fiber opposite to each of said coupler and mode scrambler milling apertures and each of said repair cavities containing material having substantially the same index of refraction as said cladding and said material adaptively injected into each of said repair cavities through a fill vent.

8. A method of fabricating optical couplers and optical mode scramblers in an optical bus which has an optical core surrounded by cladding, comprising the steps of:

forming radiation from a radiation source with a first aperture to define a predefined mode scrambler pattern;

focusing said formed radiation from said first aperture onto mode scrambler sites on the surface of cladding on top of said optical core;

controlling the energy level of said radiation so as to substantially ablate all of said cladding corresponding to said predefined mode scrambler pattern at each mode scrambler site without damaging said optical core thereby forming an optical mode scrambler at each of said mode scrambler sites;

forming radiation from radiation source with a second aperture to define a predefined coupler pattern;

focusing said formed radiation from said second aperture onto coupler sites on the surface of cladding on top of said optical core;

controlling the energy level of said radiation so as to substantially ablate all of said cladding corresponding to said predefined coupler pattern at each coupler site without damaging said optical core thereby forming a coupler opening at each of said coupler sites; and attaching coupler fibers at each of said coupler sites thereby forming a optical coupler at each of said coupler sites.

9. The method of claim 8 wherein said optical core is of a material which is substantially unaffected by said radiation at said energy level.

10. The method of claim 9 wherein said radiation source is an excimer laser.

11. The method of claim 10 further comprising the step of repairing damage to a portion of said cladding opposite each of said coupler and mode scrambler sites by radiation transmitted through said optical core from said coupler and said mode scrambler sites using a repair media having substantially the same index of refraction as said cladding.

* * * * *